(12) United States Patent
Klemmensen

(10) Patent No.: US 8,554,140 B2
(45) Date of Patent: Oct. 8, 2013

(54) METHOD OF PAIRING WIRELESS DEVICES

(75) Inventor: Bjarne Klemmensen, Smørum (DK)

(73) Assignee: Oticon A/S, Smorum (DK)

( * ) Notice: Subject to any disclaimer, the term of this patent is extended or adjusted under 35 U.S.C. 154(b) by 265 days.

(21) Appl. No.: 12/749,677

(22) Filed: Mar. 30, 2010

(65) Prior Publication Data

US 2010/0255782 A1    Oct. 7, 2010

(30) Foreign Application Priority Data

Apr. 1, 2009 (EP) ..................... 09157085

(51) Int. Cl.
*H04B 7/00* (2006.01)
(52) U.S. Cl.
USPC .......................... 455/41.2; 455/458
(58) Field of Classification Search
USPC ................. 455/41.1, 41.2, 522, 458
See application file for complete search history.

(56) References Cited

U.S. PATENT DOCUMENTS

| | | | |
|---|---|---|---|
| 2002/0183006 A1* | 12/2002 | Yasushi et al. .................. | 455/41 |
| 2003/0050009 A1 | 3/2003 | Kurisko et al. | |
| 2005/0266798 A1* | 12/2005 | Moloney et al. ............. | 455/41.2 |
| 2007/0032195 A1* | 2/2007 | Kurisko et al. .............. | 455/41.2 |
| 2008/0013601 A1* | 1/2008 | Lind et al. ..................... | 375/140 |
| 2008/0227393 A1 | 9/2008 | Tang et al. | |
| 2008/0242365 A1 | 10/2008 | Rokusek et al. | |
| 2009/0058608 A1 | 3/2009 | Gottlich | |
| 2009/0270036 A1* | 10/2009 | Michaud ..................... | 455/41.3 |

FOREIGN PATENT DOCUMENTS

| | | |
|---|---|---|
| WO | WO 2005/109781 A | 11/2005 |
| WO | WO 2008/112497 A | 9/2008 |
| WO | WO 2008/118515 A | 10/2008 |

* cited by examiner

*Primary Examiner* — Ping Hsieh
(74) *Attorney, Agent, or Firm* — Birch, Stewart, Kolasch & Birch, LLP

(57) ABSTRACT

The invention relates to a method of pairing a first device with a second device, the first and second devices being adapted for wirelessly communicating with each other, the pairing of devices aiming at ensuring communication only between trusted devices. The invention further relates to a communication device, a system, a computer readable medium and a data processing system. The object of the present invention is to provide a simple and intuitive scheme for pairing two wireless devices. The problem is solved by providing in the first device an algorithm comprising at least the following states a) A STANDBY state where the first device is in a default state; b) A CONNECTED state where wireless communication between the first and second devices is established; c) A PAIRING state comprising a pairing search state where pairing inquiries are repeatedly issued by the first device; and further providing that when the first device is NOT in the STANDBY or CONNECTED states, the first device is automatically, repeatedly brought in the pairing search state. This has the advantage of providing an automatic scheme for pairing two wireless devices. The invention may e.g. be used for wireless communication devices, e.g. portable, low-power devices, such as listening systems.

27 Claims, 6 Drawing Sheets

METHOD OF PAIRING WIRELESS DEVICES

TECHNICAL FIELD

The present invention relates to pairing of wireless devices, in particular to devices that communicate according to a digital protocol. The invention relates specifically to a method of pairing a first device with a second device, the first and second devices being adapted for wirelessly communicating with each other, the pairing of devices aiming at ensuring communication only between trusted devices. The method of pairing does not require user interaction.

The invention furthermore relates to a communication device comprising a wireless interface for wirelessly communicating with another, trusted device. The invention furthermore relates to a communication system comprising such a communication device and another, trusted communication device.

The invention further relates to a data processing system and to a computer readable medium.

The invention may e.g. be useful in applications such as wireless communication devices, e.g. portable, low-power devices, such as listening systems.

BACKGROUND ART

Digital wireless network standards such as Bluetooth or DECT or proprietary systems often include a security measure to ensure that two devices that are in operative reach of each other are mutually accepted. This procedure is termed pairing and may involve the exchange of a passkey, typically involving user input. Normally, when two Bluetooth devices are to be paired, one or more buttons on each device have to be pressed for a certain amount of time to bring the devices into a mode where pairing can occur. For elderly people or other people with limited technical skills, this may be a complicated task, which can ultimately limit the success of devices (e.g. digital wireless hearing aid accessories) based on the Bluetooth technology. In the Bluetooth 2.1 specification a so-called touch to pair feature based on near field communication according to the NFC standard is introduced.

US 2009/0058608 describes a method for connecting wireless electric actuating devices to a medical appliance via a wireless communication channel. The method comprises the steps of initiating the connection operation for a wireless electric actuating device to a medical appliance and performing a connection procedure, in which the actuating device is assigned to the medical appliance. The initiation of the connection operation is carried out from the medical appliance, e.g. via a push button.

WO 2005/109781 A1 describes a method of pairing a first electronic device and a second electronic device in a radio communications system, comprising the steps of: bringing the first and second electronic devices in proximity to each other; transmitting an inquiry signal from said second electronic device; transmitting an inquiry response signal from said first electronic device, upon detecting said inquiry signal; initiating point-to-point connection between said first electronic device and said second electronic device, based on said first electronic device being the first device to respond to said inquiry signal. Preferably, said inquiry signal has an output power restricted to a first power level, which first power level is lower than a standard signal power level in said radio communications system.

US 2003/0050009 A1 deals with a Bluetooth device wherein the output RF transmission power level during pairing is purposefully reduced from otherwise conventional or normal communication levels to a low power level, greatly reducing the range of possible interception.

DISCLOSURE OF INVENTION

The present application specifies an alternative, simple method for the pairing of two wireless devices that operate according to a predefined communication scheme. The aim of pairing is to provide a certain level of security, in that only devices of certain characteristics are able to be connected, thereby forming a closed group of devices.

An object of the present invention is to provide a simple and intuitive scheme for pairing two wireless devices.

Objects of the invention are achieved by the invention described in the accompanying claims and as described in the following.

A Method of Pairing Wireless Communication Devices:

An object of the invention is achieved by a method of pairing a first device with a second device, the first and second devices being adapted for wirelessly communicating with each other, the pairing of devices aiming at ensuring communication only between trusted devices. The method comprises, in the first device providing an algorithm comprising at least the following states A STANDBY state where the first device is in a default state;
A CONNECTED state where wireless communication between the first and second devices has been established;
A PAIRING state comprising a pairing search state where pairing inquiries are repeatedly issued by the first device; and providing that when the first device is NOT in the STANDBY or CONNECTED states, the first device is automatically, repeatedly brought in the pairing search state.

This has the advantage of providing an automatic scheme for pairing two wireless devices. In other words no user intervention is necessary for initiating a pairing process.

The term 'adapted for wirelessly communicating with each other' is in the present context taken to mean that the devices can exchange information that at some level is understood by both devices. The first and second devices are e.g. adapted to communicate in a predefined frequency range (e.g. in a non-licensed frequency range), according to predefined modulation schemes, and according to a predefined protocol.

In the present context, the terms 'mode' and 'state' are used interchangeably with no intentional difference in meaning.

In an embodiment, the STANDBY state comprises an idle or wait state, a low power state and/or a power-off state. In an embodiment, the power-off state is a separate state.

In an embodiment, 'repeatedly brought in the pairing search state' is intended to mean, according to a predefined scheme, e.g. at regular intervals in time, e.g. more frequently than every 5 minutes, such as more frequently than every minute, such as more frequently than every 15 s, such as more frequently than every 5 s, such as more frequently than every 1 s, such as more frequently than every 0.5 s, such as more frequently than every 0.25 s (>4 Hz). In an embodiment, 'repeatedly brought in the pairing search state' is intended to mean, toggling between a pairing search state and a re-connect state and/or a STANDBY state according to a predefined scheme, e.g. regularly.

In an embodiment, the method comprises providing that a transmit power $P(Tx\text{-}PS)$ of the first device when in a the pairing search state is smaller than a transmit power $P(Tx\text{-}Con)$ when in a CONNECTED state.

In an embodiment, the method comprises providing that $P(Tx\text{-}PS)$ is at least 5 times smaller than $P(Tx\text{-}Con)$, such as at least 10 times smaller such as at least 50 times smaller.

In an embodiment, the method comprises providing that the transmit power P(Tx-PS) of the first device when in a the pairing search state corresponds to a transmission range of pairing RoP smaller than 1 m, such as smaller than 0.5 m, such as smaller than 0.3 m, such as smaller than 0.1 m. The practical relation between transmit power P(Tx) and range of operation depends on antennas of the transmitting and receiving devices, on the loss of the transmit path between the two devices and on the minimum acceptable receive power P(Rx). The received power $P_{RX}$ can be expressed as $$P_{RX}=P_{TX}-D_{TX,ant}-PL-D_{RX,ant} \text{ where}$$

$P_{TX}$ is the transmitted power from the transmitting unit [dBm].
$D_{TX,ant}$ is directivity of the transmitter antenna [dB].
$D_{Rx,ant}$ is directivity of the receiving antenna [dB].
PL is the Path loss [dB].
$P_{RX}$ is the received power [dBm].

The range of operation of a given mode of operation (be it a pairing mode, e.g. pairing search mode RoP or a CONNECTED mode RoC) can e.g. be found as the maximum distance, where a given minimum received power (e.g. $P_{min}$ (Rx-PS) and $P_{min}$(Tx-Con), respectively), enough for acceptable reception of the signal in question, is received by the receiving device, when the transmitting device is transmitting with the nominal transmit power for that mode of operation (e.g. P(Tx-PS) or P(Tx-Con)).

In an embodiment, the method comprises modifying the range of pairing RoP from a first (e.g. default) value (RoP1) to a second preferred value (RoP2) (as e.g. illustrated in FIG. 1c). This can e.g. be done by adapting the value of the transmit power P(Tx-PS) in the pairing search mode. This has the advantage of allowing the pairing process to be adapted to the physical constraints of a given application (to avoid unintended pairing of devices).

In an embodiment, the method comprises providing that the duration of a pairing search state extends for a predefined PS-time. Alternatively, the method comprises that the pairing search state extends until the actions of the state has been carried out, e.g. until the received replies with device IDs (if any) have been checked for their trustworthiness and proper action has been taken (e.g. establish a connection).

In an embodiment, the method comprises providing that a pairing inquiry issued by the first device during a pairing search state comprises a request for identification, ID, of devices receiving the inquiry. In an embodiment, the ID comprises an address (e.g. a name) of the device in question. In an embodiment, the ID comprises a MAC-address (MAC=Medium Access Control). In an embodiment, the ID comprises a class-ID, e.g. defining a range of services offered by the device in question, and/or the type of device, e.g. a mobile telephone, a digital camera, a headset, an audio delivery device, etc. A class-ID can e.g. be as defined in the BlueTooth standard (or equivalent thereto). In an embodiment, a class-ID defines a specific profile of properties of the device in question, e.g. headset, handsfree, mass storage, etc. In an embodiment, the ID comprises a name of the device in question.

In an embodiment, the method comprises providing a record of trusted device IDs with which connection is allowed to be established. This can e.g. be a list of trusted devices (e.g. comprising the MAC-address and/or the Class-ID and/or the name of each trusted device) stored in the first device (e.g. in a memory, e.g. in an erasable memory or in firmware, or implemented in hardware) or based on a record read from a database, etc. In an embodiment, the method comprises (e.g. in the pairing search state) providing that a received device ID is compared to a record of trusted device IDs.

In an embodiment, the method comprises (e.g. in the pairing search state) establishing a connection to the second device, if a received device-ID is from a device on the record of trusted device IDs with which connection is allowed to be established.

In an embodiment, the method further comprises providing a CONNECT state comprising a re-connect search state where the first device is ready to receive re-connect requests from other devices and to connect, if the received ID matches a record of previously connected devices. In an embodiment, the method comprises providing that the duration of a re-connect search state extends for a predefined RC-time.

In an embodiment, the method comprises providing that the first device is adapted to toggle between the PAIRING state and the CONNECT state when not in the STANDBY or CONNECTED states. In an embodiment, the method comprises providing that the first device is adapted to toggle between the pairing search state and the re-connect search state when not in the STANDBY or CONNECTED states.

In an embodiment, the method comprises providing a record of device IDs with which connection has been most recently allowed to be established. In an embodiment, such list is established during use by storing in a (preferably read/writeable (e.g. cyclic), e.g. volatile or non-volatile) memory the ID of each device with which connection has been established (e.g. limited to the last 5-10 devices). In an embodiment, the list can be cleared by a user. In an embodiment, the method comprises providing that a received device ID from a re-connect request from another device is compared to a record of device IDs with which connection has been most recently allowed to be established.

In an embodiment, the method comprises (e.g. in the re-connect search state) establishing a connection to the second device if a received re-connect request is from a device on the record of device IDs with which connection has been most recently allowed to be established.

In an embodiment, the method comprises creating a record of device IDs (e.g. including MAC addresses) for which connection has been most recently rejected to be established. In an embodiment, such list is established during use by storing in a (preferably read/writeable (e.g. cyclic), e.g. volatile or non-volatile) memory the MAC address of each device with which connection has been rejected (e.g. limited to the last 5-10 devices). In an embodiment, the list can be cleared by a user. In an embodiment, the method comprises providing that a received MAC address from a re-connect request from another device is compared to a record of device MAC addresses with which connection has been most recently rejected to be established. In an embodiment, a pairing search initiated by a first device results in the reception by the first device of MAC-addresses from a number of replying devices within a range of pairing (RoP). In an embodiment, a list of replying devices (RD) comprising these MAC-addresses is created and stored in a memory. In an embodiment, the devices on the RD-list are sequentially requested to provide a further identification, e.g. their class-ID and/or a device name. In an embodiment, a trusted device is defined by its class-ID and/or its name. In an embodiment, the first device comprises an algorithm for deriving whether or not a device is a trusted device based on its class-ID and or on its name. In an embodiment, a list of previously rejected devices (PRD) comprising MAC-dresses on such devices, which have previously been within a range of pairing of the first device, but which were not judged to be a trusted device, is created and stored in a memory. In an embodiment, a list of previously connected devices (PCD) comprising MAC-dresses on such devices, which have previously been within a range of pairing of the first device, and which were judged to be a trusted device, is created and stored in a memory. This has the advantage that recurring, previously rejected or connected devices can be quickly dispensed with or reconnected (because a request for further identification is not needed).

In an embodiment, the method comprises further states, e.g. in that the PAIRING state further comprises a pairing request state, where the first device transmits its ID with a request to be paired to another device. In an embodiment, the CONNECT state further comprises re-connect request state, where the first device transmits its ID with a request to be re-connected to another device.

A Communication Device:

A communication device comprising a wireless interface for wirelessly communicating with another, trusted device is furthermore provided by the present invention. The wireless interface comprises a pairing/connection scheme according to the method for enabling communication between the communication device and the trusted device as described above, in the section on 'Mode(s) for carrying out the invention', in the drawings or in the claims.

In an embodiment, the communication device is adapted for transmitting a signal representative of audio to the trusted device. In an embodiment, the communication device comprises an audio delivery device, such as a microphone or a music player or an audio extension device of a TV or video player, a PC or the like.

In an embodiment, the wireless interface is based on radiated fields or on coupled electric or magnetic fields. An advantage of the present invention is that only one wireless interface (based on radiated fields OR on near-field communication) is necessary to implement the automatic pairing scheme.

A Communication System:

A communication system comprising a communication device as described above, in the section on 'Mode(s) for carrying out the invention', in the drawings or in the claims and another, trusted communication device is moreover provided by the present invention.

In general, the first and second devices are adapted to communicate according to a communication standard. In an embodiment, the first and second devices are adapted to follow a digital communication standard, e.g. wireless IEEE 802.11 or ZigBee or Bluetooth or DECT, or to follow a proprietary scheme.

In an embodiment, the other, trusted communication device form part of a listening system. In an embodiment, the listening system comprises a listening instrument, e.g. a hearing instrument, a headset, an ear phone, an active ear plug or a combination thereof. In an embodiment, the listening system comprises an audio gateway device for receiving a number of audio signals and for transmitting at least one of the received audio signals to the listening instrument.

In an embodiment, the other, trusted device is a communication device as described above, in the section on 'Mode(s) for carrying out the invention', in the drawings or in the claims.

A Computer-Readable Medium:

A tangible computer-readable medium storing a computer program comprising program code means for causing a data processing system to perform at least some of (such as a majority or all of) the steps of the method described above, in the detailed description of 'mode(s) for carrying out the invention' and in the claims, when said computer program is executed on the data processing system is furthermore provided by the present invention. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A Data Processing System:

A data processing system comprising a processor and program code means for causing the processor to perform at least some of (such as a majority or all of) the steps of the method described above, in the detailed description of 'mode(s) for carrying out the invention' and in the claims is furthermore provided by the present invention.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

FIG. 1 shows examples of devices to be paired, connected devices and zones or ranges of pairing (RoP) and connection (RoC), respectively.

Figure 1A:
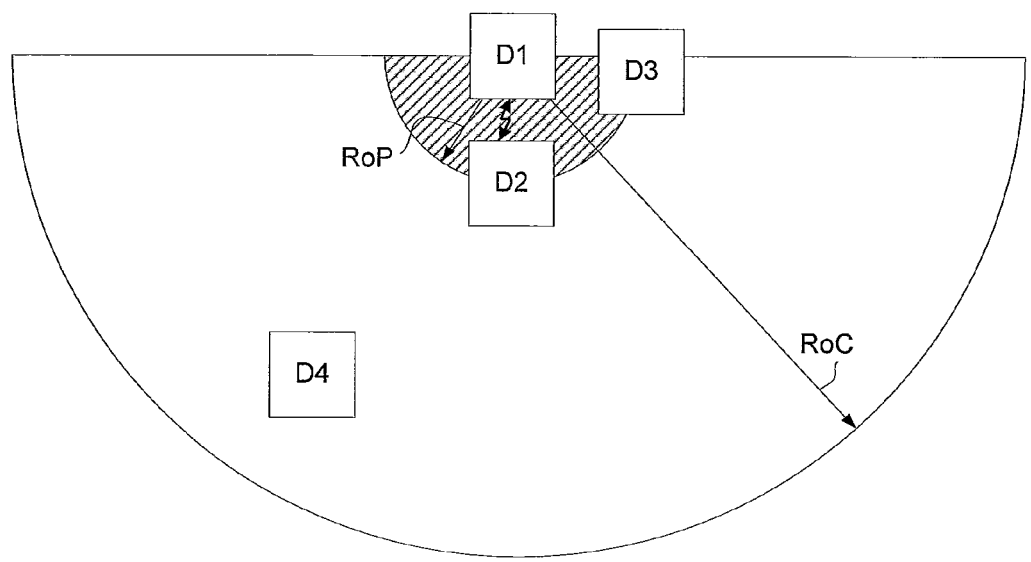
FIG. 1 shows examples of devices to be paired, connected devices and zones or ranges of pairing (RoP) and connection (RoC), respectively.

FIG. 1a shows first device D1 and a second, trusted device D2 in a PAIRING mode, wherein they are located within a range of pairing (RoP) of each other. The identification (ID) of the second trusted device D2 forwarded to the first device is recognized by the first device D1 and a connection (symbolized by the double arrowed zig-zag line) is automatically initialized. A non-trusted device D3 is shown within the range of pairing RoP of the first device D1, but is not able to be paired with the first device because its device ID is not among the trusted ones (or because the two devices are otherwise not able to understand each other). Another, trusted device D4 is located within the range of connection (RoC) of the first device, but because the first device is in a PAIRING mode (where its transmission power is reduced compared to a CONNECTED mode), D4 is (in this mode) out of reach of D1.

Figure 1B:
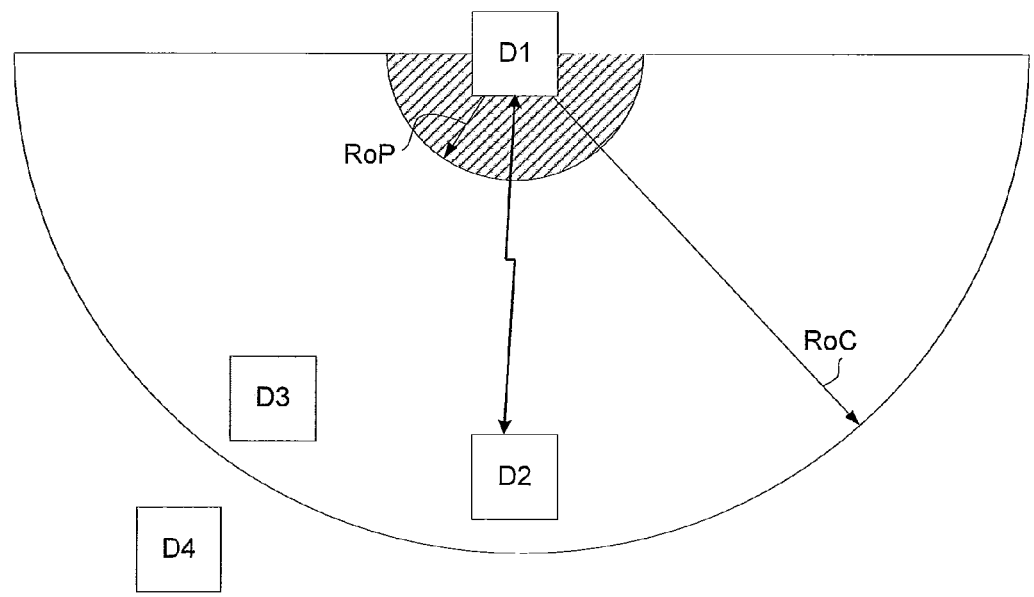

FIG. 1b shows a situation where the first and second devices D1 and D2 are in a CONNECTED state. Device D2 is within the range of connection (RoC) of D1. Additional trusted device D4 is out of reach of the first device because it is farther away from D1 than the range of connection RoC. Device D3 is within RoC, but cannot be connected to D1 because its ID and/or class is/are not known or accepted by D1 (or because the two devices are otherwise not compatible).

Figure 1C:
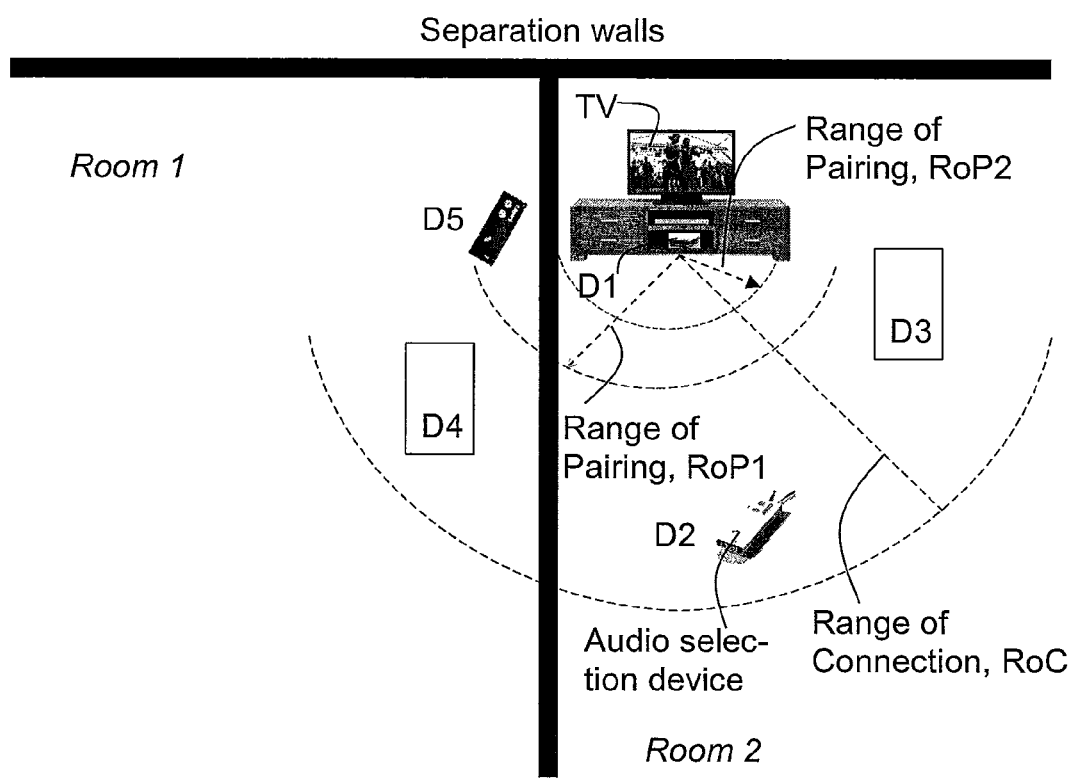

FIG. 1c depicts a typical user scenario for two first and second accessory devices to a hearing aid, a TV-box D1 (the first device) for wirelessly transmitting a TV-sound signal and an audio selection device D2 (the second device) for receiving a number of audio signals and (wirelessly) forwarding one of them to a hearing aid (or a pair of hearing aids). The TV-box is located near the TV and if connected to the audio selection device, the TV audio signal is transmitted by means of a digital wireless link from the TV-box to the audio selection device. In case the TV-box D1 is not connected to the audio selection device D2 (or to another trusted device, e.g. the pair of ear phones D4 or a headset D3) or is in a standby mode, the TV-box of the embodiment of FIG. 1c is adapted to automatically shift between pairing search and re-connect search mode.

When specifying a new pairing strategy, various scenarios, requirements and wishes should preferably be considered.

For example, in an apartment, where a device D5 located in a first room (Room 1 in FIG. 1c) within the reach of a pairing device, e.g. the TV-Box 1, located in a second room (Room 2) as shown in FIG. 1c, the risk of unintentionally connecting the 'neighbouring' device D5 to the TV-Box D1 should preferably be minimised.

The issue is e.g. handled by minimising the distance between the TV-box and the audio selection device in the pairing situation to a predefined (maximum) distance, whereas the distance between the TV-box and the audio selection device during normal operation should preferably be maximised to assure user satisfaction. The two relevant ranges are defined as follows:
1. A Range of Pairing (RoP) is defined as the maximum distance between the two devices within which they are able to pair.
2. A Range of Connection (RoC) is defined as the maximum range, within which the two devices are capable of exchanging audio data of an acceptable (e.g. predefined) quality and for which the two devices can be reconnected in case one has been turned off or has been temporarily moved out of range.

Figure 4:
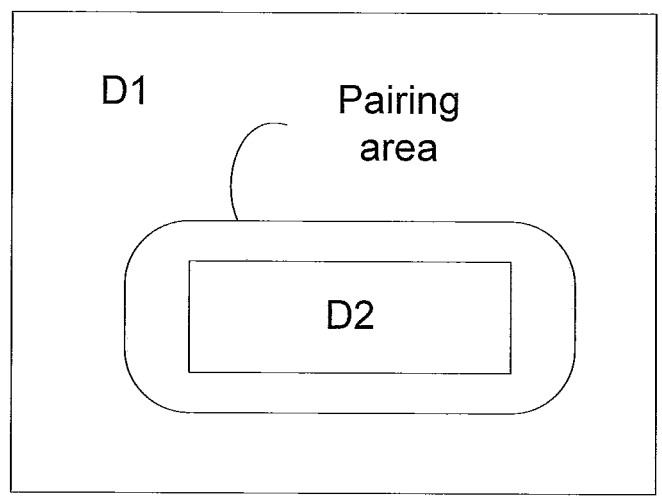
FIG. 4 shows a preferred pairing area for a second device D2 located on a first device D1.

The range of operation can e.g. be modified by adapting the transmit power P(Tx-PS) of the TV-box to a specific (here) lower value than the default value, so that the range of pairing RoP is changed from a (default) RoP1-value to an adapted RoP2-value whereby the unintended pairing problems can be minimized. In an embodiment, the RoP can be adjusted (either manually by the user or by a technician during fitting of the system, e.g. via a software setting). Alternatively, the default transmit power P(Tx-PS) could be set to ensure a range of pairing below a very limited RoP-value, e.g. corresponding to less than 0.5 m, such as in a range from a minimum to a maximum RoP value, e.g. from 0.05 m to 0.5 m, such as from 0.1 m to 0.3 m. In an embodiment, a user friendly way of pairing is to adapt the system to provide that the audio selection device is paired to the TV-box when placed on top of or immediately next to each other during pairing. In an embodiment, an indication or a preferred Pairing area, e.g. a drawing outline or a small extending fence on or a groove in the casing of a first device D1 (here the TV-box) indicating a proper placement of a second device D2 (here an audio selection device or a headset or a pair of headphones) to be paired during a pairing search state of the TV-box, is provided (cf. FIG. 4).

Alternatively, a fixed (relatively high or maximum) Tx-power setting could be set and then attenuated (preferably continuously or in steps) according to the need for limiting the range of operation RoP during pairing.

In an embodiment, the minimum search transmit power P(Tx-PS) setting is −49 dBm, reducing the effective maximum RoP to around 0.5 m in the setup of FIG. 1c.

To decide that a device is within the RoP, an RF analysis must be performed. A simple model for the received RF power $P_{RX}$ of a given receiving device (e.g. TV-box in FIG. 1c) is given by $$P_{PX} = P_{TX} - D_{TX,ant} - PL - D_{RX,ant} \text{ where}$$

$P_{TX}$ is the transmitted power from the transmitting unit [dBm].
$D_{TX,ant}$ is directivity of the transmitter antenna [dB].
$D_{RX,ant}$ is directivity of the receiving antenna [dB].
PL is the Path loss [dB].
$P_{RX}$ is the received power [dBm].

TABLE 1

RF data for the example of FIG. 1c.

| Unit | $D_{ant}$ | $P_{TX, max}$ | $P_{RX, min}$ |
|---|---|---|---|
| Audio selection device RF data | 0 dB | 4 dBm | −80 dBm |
| TV-box RF data | 0 dB | 6 dBm | −85 dBm |

The minimum acceptable received power in the TV-box or threshold power $P_{RX,th}$ during pairing can be estimated:

$$P_{RX,th} = P_{TX} - D_{TX,ant} - PL - D_{RX,ant} = 4 \text{ dBm} - 0 \text{ dB} - 50 \text{ dB} - 0 \text{ dB} = -46 \text{ dBm} \approx -50 \text{ dBm}$$

It is required/assumed that the audio selection device during pairing transmits with maximum power.

Likewise the TV-box transmit pairing power $P_{TX,pair}$ can be found as:

$$P_{TX,pair} = P_{RX,min,Streamer} - D_{RX,ant} - PL - D_{RX,ant} = -80 \text{ dBm} - 0 \text{ dB} - 50 \text{ dB} - 0 \text{ dB} = -30 \text{ dBm}$$

Other devices, like e.g. a PC, a headset or a mobile telephone may frequently be within a RoP. In a preferred embodiment these devices may have already been identified as non-relevant devices in former pairing sessions, whereby time is saved in the current pairing session. In an embodiment, up to 10 devices can be registered as non-relevant.

FIG. 2 shows schematic state diagrams of pairing/connection algorithms according to embodiments of the present invention.

Figure 2A:
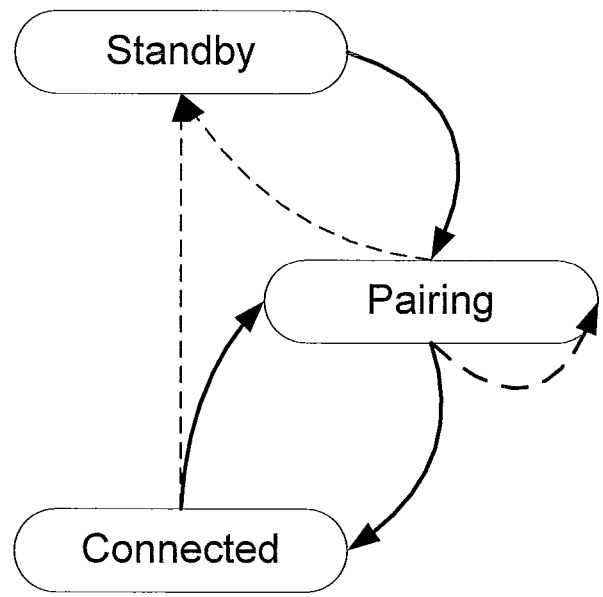
FIG. 2 shows schematic state diagrams of pairing/connection algorithms according to embodiments of the present invention.

The algorithm shown in FIG. 2a comprises a STANDBY state, a PAIRING state and a CONNECTED state.

STANDBY State:

The STANDBY state is the default state in the device. In this state, the device may be in a low-power mode and the device may leave the STANDBY state to a PAIRING state, e.g. to search for pairing requests or to issue a pairing request itself.

PAIRING State:

The PAIRING state is used to discover new (trusted) devices (pairing search) issuing requests for being paired (and to pair and connect, if the received request is from a trusted device) or a pairing request state where the device itself issues a request for being paired with another device.

CONNECTED State:

The CONNECTED state is the state where two mutually trusted devices are connected (i.e. in one- or two way communication with each other).

In an embodiment, the method comprises providing that the first device is adapted to be in the PAIRING state when not in the STANDBY or CONNECTED states (cf. dashed arrow from PAIRING state to itself). The dashed arrows from PAIRING and CONNECTED states to STANDBY represent alternative or additional options. If e.g. the device is forced into a low power mode (e.g. by a lack of sufficient operational power or a user setting), the STANDBY state would be automatically entered from any of the other states.

Figure 2B:
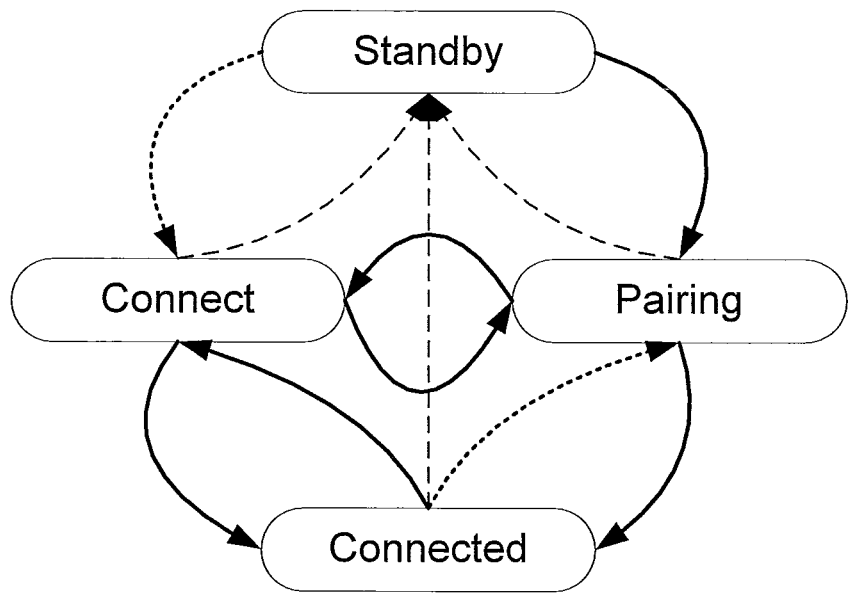

The algorithm shown in FIG. 2b comprises a STANDBY state, a PAIRING state, a CONNECT state and a CONNECTED state.

CONNECT State:

The CONNECT state comprises a re-connect (search) state where the first device is ready to receive re-connect requests from other devices (and to connect, if a received request is from a previously connected device). It may further comprise a re-connect request state where the first device itself issues requests for being re-connected with another device.

Typically the algorithm starts from the STANDBY mode and enters the PAIRING mode from where it can go to the CONNECTED mode (if e.g. paired with a trusted device). In an embodiment, the algorithm may alternatively start in the CONNECT mode (cf. dotted line from the STANDBY to CONNECT states in FIG. 2b) and try to re-connect to possible devices within its range of connection RoC to which it has previously been connected (if any). In an embodiment, the method comprises providing that the first device is adapted to toggle between the PAIRING state and the CONNECT state when not in the STANDBY or CONNECTED states (cf. arrows between the CONNECT and PAIRING states). In an embodiment, the method comprises providing that the first device is adapted to toggle between the pairing search state and the re-connect search state when not in the STANDBY or CONNECTED states. In an embodiment, the algorithm changes to the CONNECT state from the CONNECTED state when the wireless link is disconnected (by intention or mistake). The dashed arrows from the PAIRING, CONNECT and CONNECTED states to the STANDBY state represent alternative or additional options. If e.g. the device is forced into a low power mode (e.g. by a lack of sufficient operational power or a user setting), the STANDBY state would be automatically entered from any of the other states.

FIG. 3 shows examples of simple pairing/connect algorithms according to embodiments of the present invention.

Figure 3A:
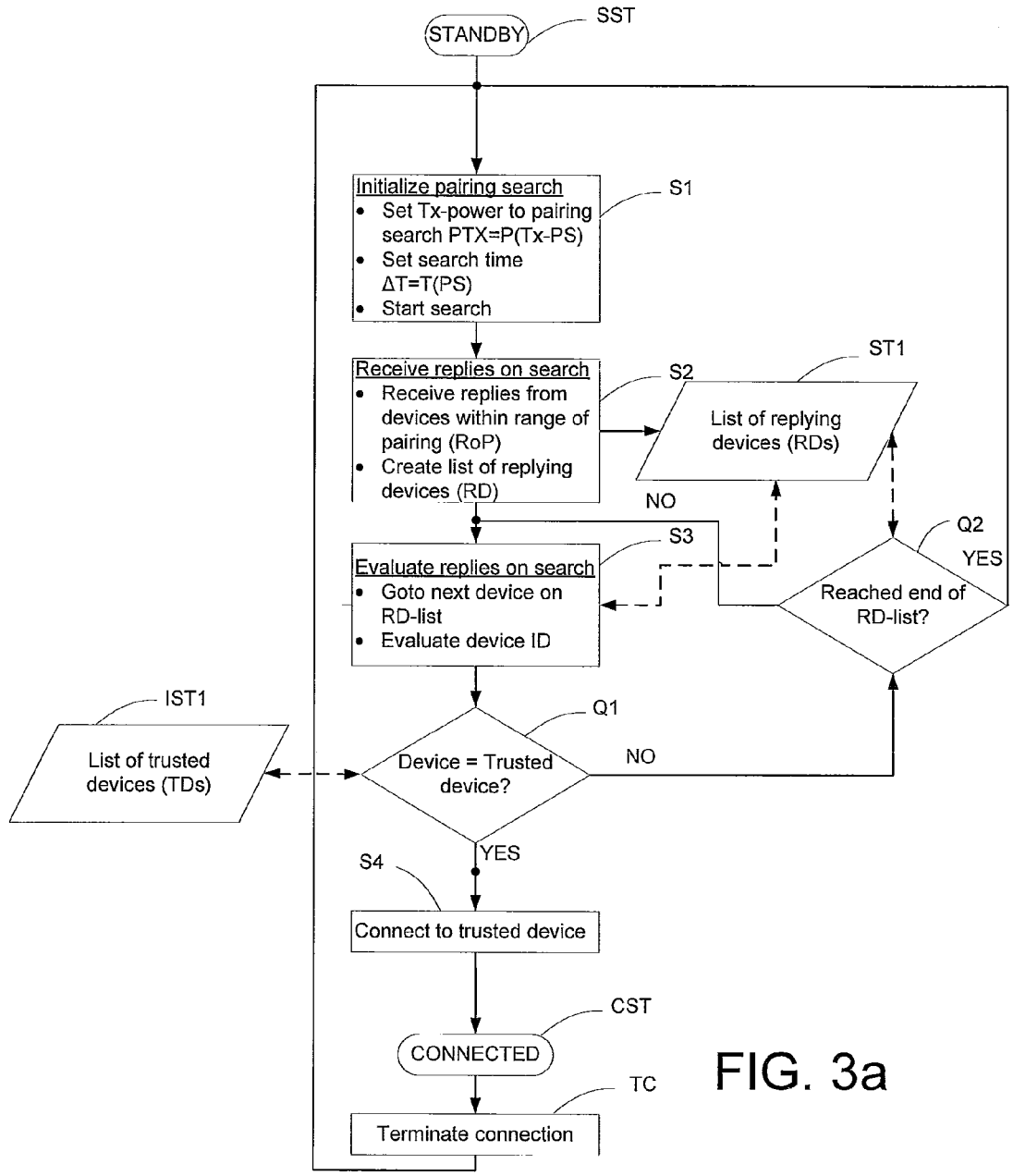
FIG. 3 shows examples of simple pairing/connect algorithms according to embodiments of the present invention.

FIG. 3a shows a first example of a more detailed version of an embodiment of the state diagram of FIG. 2a illustrating the PAIRING state.

The PAIRING state is e.g. reached from the STANDBY state (SST, e.g. after a power-on, or at predefined (e.g. regular) points in time during a STANDBY state). The PAIRING state may comprise the following actions:

S1: Initialize Pairing Search
  Set Tx-power to pairing search PTX=P(Tx-PS)
  Set search time $\Delta T=T(PS)$ (e.g. including setting a start time for the search according to a predefined algorithm, e.g. involving the present time $T_{present}$ and/or an absolute reference time $T_{ref}$; set $T_{start}$ (and thus an end time $T_{end}=T_{start}+\Delta T$)
  Start search S2: Receive Replies on Search
  Receive replies from devices within range of pairing (RoP)
  Create list of replying devices (RD) (i.e. create list of replying devices (ST1) stored in a memory of the device running the pairing algorithm; e.g. preceded by a deletion of the previous list, such list e.g. comprising or consisting of a MAC-address of each replying device)

S3: Evaluate Replies on Search
  Goto next device on RD-list
  Evaluate device ID (cf. list ST1)

Question 1 (Q1):
  Is Device=Trusted device? (it is to be understood that a list of trusted devices (IST1), e.g. comprising their MAC addresses in full or in part and/or a class-ID and/or a name of the devices and or/an algorithm for defining such trusted devices, has been stored in and/or is accessible to the (first) device running the pairing algorithm prior to and/or during its operation. A consultation of such list or algorithm is indicated by the dashed double-arrowed line)

If Yes:
  ST1: Store device ID on list of previously connected devices (PCDs), and S4: Connect to Trusted Device
  Enter CONNECTED state (CST) where a link between the two devices in question is established until the connection is terminated in step 'terminate connection' (TC), which leads to a return to the first step (S1) of the PAIRING state (or to the STANDBY state (SST) or to a re-connect state).

If No:
Question 2 (Q2):
  Has the end of the list of replying devices been reached? (consult list (ST1) of replying devices (RD), indicated by dashed double-arrowed line).

If No:
  Goto step S3 of the PAIRING state.

If Yes:
  Goto the first step (S1) of the PAIRING state (or alternatively to the STANDBY state (SST) or to a re-connect state).

In case the search time T(PS) has been reached before the end of the list of replying devices has been reached (which is not intended to be typical) or if no replies have been received, the algorithm may automatically start from the beginning (step S1) or be adapted to change to another state (e.g. to the CONNECT state as shown in FIG. 2b, e.g. a re-connect (search) state) to ensure automatic pairing/reconnect, or to the STANDBY state)

Figure 3B:
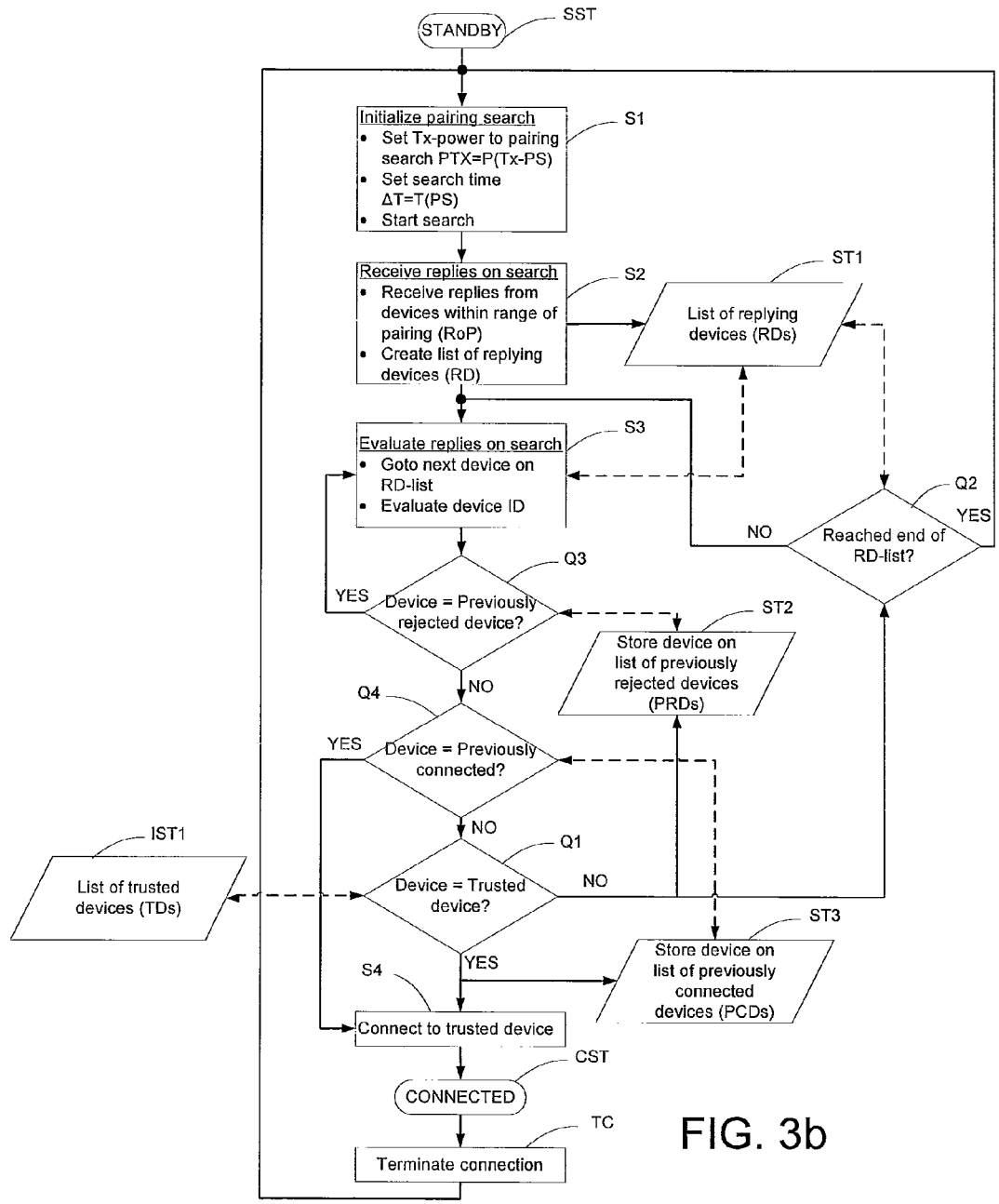

FIG. 3b shows a second example of a more detailed version of an embodiment of the state diagram of FIG. 2a illustrating the PAIRING state.

The PAIRING state is e.g. reached from the STANDBY state (SST, e.g. after a power-on, or at predefined (e.g. regular) points in time during a STANDBY state). The PAIRING state may comprise the following actions:

S1: Initialize Pairing Search
  Set Tx-power to pairing search PTX=P(Tx-PS)
  Set search time ΔT=T(PS) (e.g. including setting a start time for the search according to a predefined algorithm, e.g. involving the present time $T_{present}$ and/or an absolute reference time $T_{ref}$; set $T_{start}$ (and thus an end time $T_{end}=T_{start}+\Delta T$)
  Start search S2: Receive Replies on Search
  Receive replies from devices within range of pairing (RoP)
  Create list of replying devices (RD) (i.e. create list of replying devices (ST1) stored in a memory of the device running the pairing algorithm; e.g. preceded by a deletion of the previous list, such list e.g. comprising or consisting of a MAC-address of each replying device)

S3: Evaluate Replies on Search
  Goto next device on RD-list (cf. list ST1)
  Evaluate device ID Question 3 (Q3):
  Is Device=Previously rejected device? (consult list ST2 of previously rejected devices (PRDs) (indicated by dashed double-arrowed line) created in connection with Q1, see below. The PRD-list e.g. comprises or is constituted by the MAC-addresses of such devices)
  If Yes:
    Goto the third step (S3) of the PAIRING state to evaluate the next device on the RD list.
  If No:
    Is Device=Previously connected device? (consult list ST3 of previously connected devices (PCDs) (indicated by dashed double-arrowed line) created in connection with Q1, see below. The PCD-list e.g. comprises or is constituted by the MAC-addresses of such devices)

Question 1 (Q1):
  Is Device=Trusted device? (it is to be understood that a list of trusted devices (IST1), e.g. comprising their MAC addresses in full or in part) and/or a class-ID and/or a name of the devices and or/an algorithm for defining such trusted devices, has been stored in and/or is accessible to the (first) device running the pairing algorithm prior to and/or during its operation. A consultation of such list or algorithm is indicated by the dashed double-arrowed line).
  If Yes:
    Store device ID on list (ST3) of previously connected devices (PCDs), and S4: Connect to Trusted Device.
  Enter CONNECTED state (CST) where a link between the two devices in question is established until the connection is terminated in step terminate connection (TC), which leads to a return to the first step (S1) of the PAIRING state (or to the STANDBY state (SST) or to a re-connect state).
  If No:

Question 2 (Q2):
  Has the end of the list of replying devices (RD) been reached? (consult list (ST1) of replying devices (RD), indicated by dashed double-arrowed line).
  If No:
    Goto step S3 of the PAIRING state.
  If Yes:
    Goto the first step (S1) of the PAIRING state (or alternatively to the STANDBY state (SST) or to a re-connect state).

In case the search time T(PS) has been reached before the end of the list of replying devices has been reached (which is not intended to be typical) or if no replies have been received, the algorithm may automatically start from the beginning (step S1) (e.g. at a predefined point in time defined by an algorithm) or be adapted to change to another state (e.g. to the CONNECT state as shown in FIG. 2b, e.g. a re-connect (search) state) to ensure automatic pairing/reconnect, or to the STANDBY state).

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

US 2009/0058608 (Carl Zeiss Surgical) 5 Mar. 2009
WO 2005/109781 A1 (SONY ERICSSON MOBILE COMMUNICATIONS) 17 Nov. 2005
US 2003/0050009 A1 (Kurisko and Mooney) 13 Mar. 2003

The invention claimed is:

1. A method of pairing a first device with a second device, the first and second devices being adapted for wirelessly communicating with each other, the pairing of devices aiming at ensuring communication only between trusted devices, the method comprising:
  in the first device providing an algorithm comprising at least the following states
    A STANDBY state where the first device is in a default state;
    A CONNECTED state where wireless communication between the first and second devices has been established; and
    A PAIRING state comprising a pairing search state where pairing inquiries are repeatedly issued by the first device;
  providing that when the first device is NOT in the STANDBY or CONNECTED states, the first device is automatically, repeatedly brought in the pairing search state;
  initiating a pairing search by the first device;
  receiving by the first device MAC-addresses from a number of replying devices responding to the initiated pairing search;
  creating a first list of the replying devices, the first list including said MAC-addresses;
  creating a second list of previously rejected devices (PRD) comprising MAC-addresses of devices which have previously been within a range of pairing of the first device, but which were judged to be a device that is not trusted to be paired with the first device;
  creating a third list of previously connected devices (PCD) comprising MAC-addresses of devices which were previously judged to be a trusted device;
  storing said first, second, and third list in a memory of the first device; and
  sequentially requesting further identification including a class-ID and/or a device name from devices on said list, wherein
  a trusted device is defined by its class-ID and/or its name.

2. A method according to claim 1 comprising providing that a transmit power P(Tx-PS) of the first device when in the pairing search state is smaller than a transmit power P(Tx-Con) when in a CONNECTED state.

3. A method according to claim 2 comprising providing that P(Tx-PS) is at least 5 times smaller than P(Tx-Con).

4. A method according to claim 2 comprising providing that the transmit power P(Tx-PS) of the first device when in a the pairing search state corresponds to a transmission range of pairing RoP smaller than 1 m.

5. A method according to claim 1 comprising providing that the duration of a pairing search state extends for a pre-defined PS-time.

6. A method according to claim 1 comprising providing that a pairing inquiry issued by the first device comprises a request for identification, ID, of devices receiving the inquiry.

7. A method according to claim 6 comprising providing a record of trusted device IDs with which connection is allowed to be established.

8. A method according to claim 7 comprising providing that a received device ID is compared to a record of trusted device IDs.

9. A method according to claim 6 wherein a device ID comprises a MAC address and/or a class-ID, and/or a device name.

10. A method according to claim 1 comprising providing that the method further comprises a CONNECT state comprising a re-connect search state where the first device is ready to receive re-connect pairing requests from other devices.

11. A method according to claim 10 comprising providing that the duration of a re-connect search state extends for a predefined RC-time.

12. A method according to claim 10 comprising providing that a received device ID from a re-connect request from another device is compared to a record of device IDs with which connection has been most recently allowed to be established.

13. A method according to claim 1 comprising providing that the first device is adapted to toggle between the PAIRING state and the CONNECT state when not in the STANDBY or CONNECTED states.

14. A method according to claim 13 comprising providing that the first device is adapted to toggle between the pairing search state and the re-connect search state when not in the STANDBY or CONNECTED states.

15. A method according to claim 1 comprising providing a record of device IDs with which connection has been most recently allowed to be established.

16. A method according to claim 1 comprising creating a record of device IDs for which connection has been most recently rejected to be established.

17. A method according to claim 1, wherein
the first device is brought in the pairing search state at regular intervals in time, more frequently than every 5 minutes.

18. A method according to claim 1, wherein
the first device is repeatedly brought in the pairing search state by toggling between a pairing search state and a re-connect search state and/or a STANDBY state according to a predefined scheme.

19. A method according to claim 1, further comprising:
modifying the range of pairing RoP from a first value RoP1 to a second preferred value RoP2 by adapting the value of the transmit power P(Tx-PS) in the pairing search state.

20. A method according to claim 1, wherein the first device comprises an algorithm for deriving whether or not a device is a trusted device based on its class-ID and/or on its name.

21. A method according to claim 1, wherein the STANDBY state comprises at least one of an idle state, a wait state, a low power state, and a power-off state.

22. A method according to claim 1, wherein a minimum acceptable receive power Pmin(Rx-PS) of the first device when in a pairing search state is −50 dBm.

23. A method according to claim 1, wherein the second device during pairing transmits with maximum power.

24. A non-transitory tangible computer-readable medium encoded with instructions, wherein the instructions when executed on a data processing system cause the data processing system to perform a method comprising:
providing in a first device an algorithm comprising at least the following states
A STANDBY state where the first device is in a default state,
A CONNECTED state where wireless communication between the first and second devices has been established, and
A PAIRING state comprising a pairing search state where pairing inquiries are repeatedly issued by the first device;
providing that when the first device is NOT in the STANDBY or CONNECTED states, the first device is automatically, repeatedly brought in the pairing search state;
initiating a pairing search by the first device;
receiving by the first device MAC-addresses from a number of replying devices responding to the initiated pairing search;
creating a first list of the replying devices, the list including said MAC-addresses;
creating a second list of previously rejected devices (PRD) comprising MAC-addresses of devices which have previously been within a range of pairing of the first device, but which were judged to be a device that is not trusted to be paired with the first device;
creating a third list of previously connected devices (PCD) comprising MAC-addresses of devices which were previously judged to be a trusted device;
storing said first, second, and third list in a memory of the first device; and
sequentially requesting further identification including a class-ID and/or a device name from devices on said list, wherein
a trusted device is defined by its class-ID and/or its name.

25. A communication device, comprising:
a wireless interface configured to wirelessly communicate with a trusted device, wherein
the wireless interface is further configured to
provide in the communication device an algorithm comprising at least the following states
A STANDBY state where the communication device is in a default state,
A CONNECTED state where wireless communication between the communication device and a second device has been established, and
A PAIRING state comprising a pairing search state where pairing inquiries are repeatedly issued by the communication device;
provide that when the communication device is NOT in the STANDBY or CONNECTED states, the communication device is automatically, repeatedly brought in the pairing search state;

initiate a pairing search by the communication device;

receive MAC-addresses from a number of replying devices responding to the initiated pairing search;

create a first list of the replying devices, the list including said MAC-addresses;

create a second list of previously rejected devices (PRD) comprising MAC-addresses of devices which have previously been within a range of pairing of the first device, but which were judged to be a device that is not trusted to be paired with the communication device;

create a third list of previously connected devices (PCD) comprising MAC-addresses of devices which were previously judged to be a trusted device;

store said first, second, and third list in a memory of the communication device; and sequentially request further identification including a class-ID and/or a device name from devices on said list, wherein a determination whether a replying device is the trusted device is based on its class-ID and/or its name.

26. A communication device according to claim 25, wherein the wireless interface is configured to transmit a signal representative of audio to the trusted device.

27. A communication device according to claim 25, further comprising:

at least one of a microphone, a music player, and an audio extension device of a TV, video player, or a PC.

\* \* \* \* \*